(12) United States Patent
Koren et al.

(10) Patent No.: US 12,192,066 B2
(45) Date of Patent: Jan. 7, 2025

(54) DECISION OPTIMIZATION MECHANISM FOR DEVICE CLASSIFICATION

(71) Applicant: FORESCOUT TECHNOLOGIES, INC., San Jose, CA (US)

(72) Inventors: Itai Koren, Tel Aviv (IL); Nadav Gothait, Ramat Gan (IL); Michael Oks, Holon (IL); Shay Shemer, Hod Hasharon (IL)

(73) Assignee: Forescout Technologies, Inc., San Jose, CA (US)

(*) Notice: Subject to any disclaimer, the term of this patent is extended or adjusted under 35 U.S.C. 154(b) by 23 days.

(21) Appl. No.: 18/062,860

(22) Filed: Dec. 7, 2022

(65) Prior Publication Data

US 2023/0318931 A1    Oct. 5, 2023

Related U.S. Application Data

(60) Provisional application No. 63/327,277, filed on Apr. 4, 2022.

(51) Int. Cl.
*H04L 41/16* (2022.01)
*G06F 18/241* (2023.01)
*H04L 43/062* (2022.01)

(52) U.S. Cl.
CPC ............ *H04L 41/16* (2013.01); *G06F 18/241* (2023.01); *H04L 43/062* (2013.01)

(58) Field of Classification Search
CPC ..... H04L 43/045; H04L 41/147; H04L 43/08; H04L 41/145; H04L 43/16; H04L 43/0876; H04L 43/062; H04L 41/16; G06F 18/241; G06N 20/00
See application file for complete search history.

(56) References Cited

U.S. PATENT DOCUMENTS

| | | | |
|---|---|---|---|
| 9,516,053 B1* | 12/2016 | Muddu | G06F 16/9024 |
| 10,715,570 B1* | 7/2020 | Feinstein | H04L 65/61 |
| 10,810,695 B2* | 10/2020 | Knopp | G06Q 40/08 |
| 10,902,290 B1* | 1/2021 | Kim | G06V 10/764 |
| 10,902,291 B1* | 1/2021 | Kim | G06F 18/217 |
| 11,102,093 B2* | 8/2021 | Gupta | H04L 43/106 |
| 11,115,289 B1* | 9/2021 | Haefner | H04L 41/147 |
| 11,455,569 B2* | 9/2022 | Valdez | G06N 20/00 |
| 2015/0379141 A1* | 12/2015 | Stouffer | G06F 16/951 707/706 |
| 2016/0073271 A1* | 3/2016 | Schultz | H04W 64/003 455/410 |
| 2018/0096260 A1* | 4/2018 | Zimmer | G06N 5/04 |
| 2018/0152380 A1* | 5/2018 | Wang | H04W 28/0284 |
| 2018/0198812 A1* | 7/2018 | Christodorescu | H04L 63/1425 |
| 2018/0316704 A1* | 11/2018 | Joseph Durairaj | H04L 41/142 |
| 2019/0312800 A1* | 10/2019 | Schibler | H04L 41/0869 |
| 2019/0332719 A1* | 10/2019 | Keskar | G06F 40/30 |

(Continued)

*Primary Examiner* — Ninos Donabed
(74) *Attorney, Agent, or Firm* — Womble Bond Dickinson (US) LLP (57) ABSTRACT

Systems, methods, and related technologies relate to obtaining a first classification of a device on a network from a first source, obtaining a second classification of the device on the network from a second source wherein the first classification and the second classification are different, and determining a classification result of the device based on selecting at least one of the first classification or the second classification.

17 Claims, 5 Drawing Sheets

(56) References Cited

U.S. PATENT DOCUMENTS

| | | | |
|---|---|---|---|
| 2020/0092181 A1* | 3/2020 | Thiagarajan | H04L 45/121 |
| 2020/0205030 A1* | 6/2020 | Wang | H04L 47/215 |
| 2020/0211052 A1* | 7/2020 | Tasharofi | G06N 20/00 |
| 2020/0322247 A1* | 10/2020 | Zhao | H04L 43/062 |
| 2020/0380293 A1* | 12/2020 | Finnie | G06F 18/211 |
| 2020/0403991 A1* | 12/2020 | Sohail | H04L 63/1433 |
| 2021/0374754 A1* | 12/2021 | Pandian | G06Q 20/4016 |
| 2022/0021770 A1* | 1/2022 | Zhang | H04W 4/24 |
| 2022/0374770 A1* | 11/2022 | Pavlichenko | G06V 10/764 |
| 2023/0098508 A1* | 3/2023 | Mishra | H04L 63/205 |
| | | | 726/23 |
| 2023/0188552 A1* | 6/2023 | Sern | H04L 63/1433 |
| 2023/0216870 A1* | 7/2023 | Allouche | H04L 63/1425 |
| | | | 726/23 |

* cited by examiner

DECISION OPTIMIZATION MECHANISM FOR DEVICE CLASSIFICATION

CROSS-REFERENCE TO RELATED APPLICATION

This application claims the benefit of U.S. Provisional Patent Application No. 63/327,277 filed Apr. 4, 2022, which is incorporated by reference herein in its entirety.

TECHNICAL FIELD

Aspects and implementations of the present disclosure relate to network monitoring, and more specifically, to classifying a device on a computer network using multiple sources.

BACKGROUND

Computing devices may communicate with each over a computer network. In a computer network, computing devices can be communicatively coupled to each other over physically wired, optical, or wireless radio-frequency technology. A computer network can have a variety of network topologies. As technology advances, the number and variety of devices that communicate over computer networks increase, as does the amount of data and importance of such data on each computing device. Devices that are communicatively coupled to the network can be classified to help manage the network for a variety of purposes such as, for example, mitigating security risks, performing load balancing, allocating services, or performing updates.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to classification of one or more devices on a computer network. A network management system may benefit from classifying devices on a computer network for a variety of purposes such as, for example, mitigating security risks, performing load balancing, allocating services, performing updates, or other purposes. Classifying the devices on a network may include determining the presence and addressing (e.g., an IP address) of each device on the network, and determining the role each device performs (e.g., a television, a computer tablet, a printer, a server, etc.), the class vendor, the model, the firmware, the operating system, or other information or a combination of thereof of each device.

Under existing solutions, a network management system may use one of various approaches to classify a device. For example, a network management solution may parse through network traffic to glean the information of each device. In another example, a network management solution may actively poll one or more devices to obtain their information which can then be used to classify them. Different sources, however, may characterize the same device differently. Thus, existing solutions may fail to effectively determine a classification of a device using multiple classification sources.

Accordingly, systems, methods, techniques, and related technologies are described herein in various implementations that includes a network management system (e.g., a network monitor entity) that may obtain a plurality of classifications, respectively, from different sources, that classifies a device on a computer network. The system may select which of the plurality of sources to use for classifying the device. This selection may be made using one or more source selection algorithms, such as a score-based approach, a depth-based approach, or a text-mining approach.

In some examples, the network management system may utilize a score configuration table to determine which source is the better source for a given classification (e.g., a specific property) of a device. Further, the network monitor entity may utilize a source configuration file that includes each of the sources that are on the network and are working to classify devices on the network. Further, the source configuration file may include property names that each source may provide in their respective classification of a device. In such a manner, the network monitor entity may scale out its functionality to resolve classification of any number of new sources, by updating the score configuration table, or source configuration file, or both, without rebuilding source code of the system or redesign of the system.

The network management system may perform one or more operations based on the classification of each device, such as performing network segmentation. The network management system may include one or more enforcement points to perform network segmentation or other operations.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein. In some embodiments, aspects described in terms of a device (e.g., classifying a device) also extends to an entity. For example, embodiments may obtain a plurality of classifications, respectively, from different sources, that classifies an entity on a computer network. The system may select which of the plurality of sources to use for classifying the entity. This selection may be made using one or more source selection algorithms, such as a score-based approach, a depth-based approach, or a text-mining approach. Other aspects described in terms of a device also extend to an entity.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network. A segmentation policy or suggestion may include access rules that are determined to reduce a security risk of one or more devices on the network.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Further, aspects of the present disclosure cannot be practicably performed by a human given that the data on the network is too numerous and fast for a human to sort through to glean what devices are present on the network, much less doing so in real-time or in a reliable manner. Further, a human could not compare the various traffic to find a matching fingerprint as described in other sections, given that the number of fingerprints can exceed 1000 or 2000, or 5000, nor could a human perform many of the other aspects described.

Figure 1:
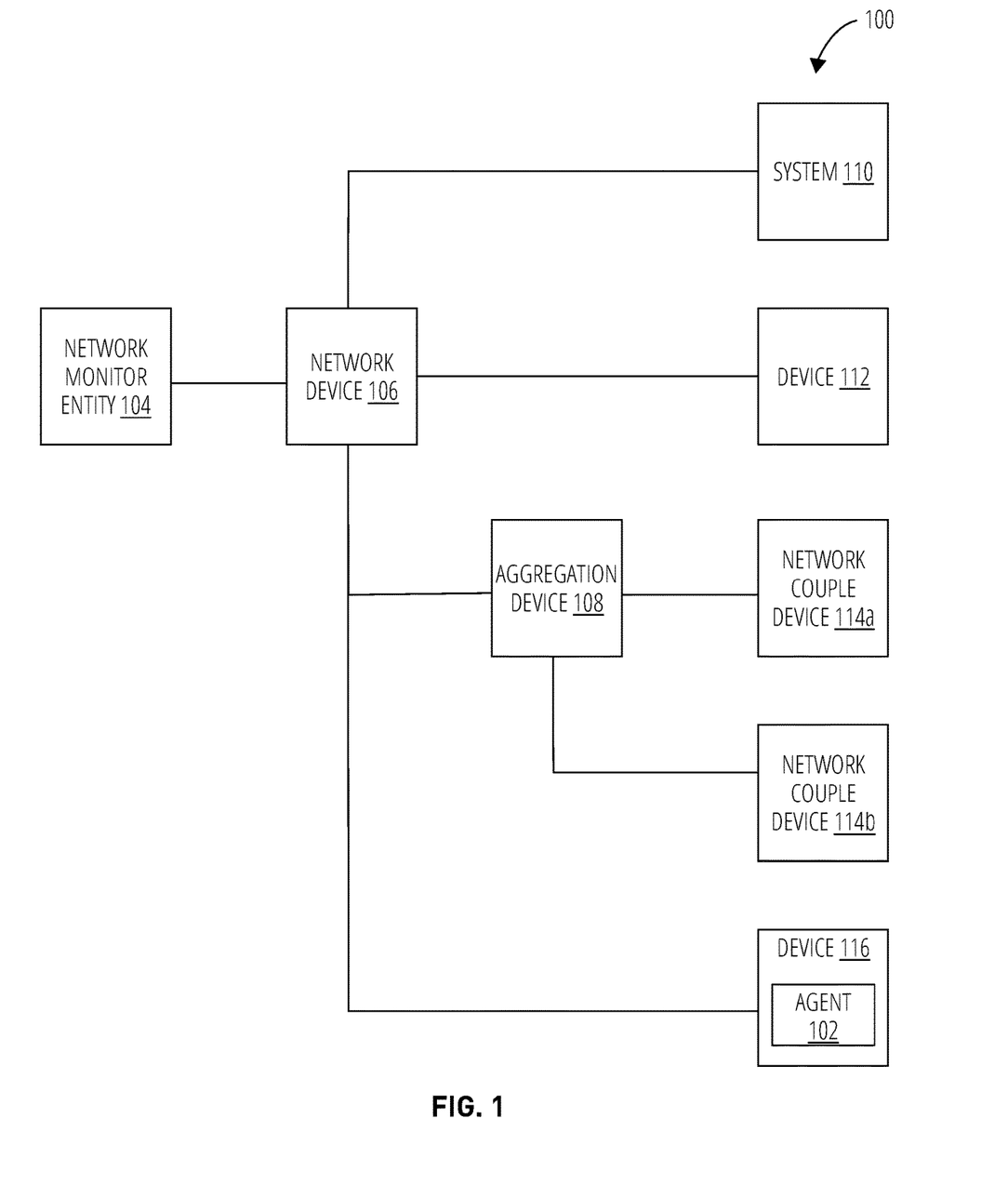
FIG. 1 depicts an example of a communication network in accordance with one implementation of the present disclosure.

FIG. 1 depicts an illustrative communication network 100, in accordance with one implementation of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining classification of each of one or more devices on a network (e.g., using multiple classification sources), determining a security risk of the device based at least on the classification, and segmenting the network in response to if the security risk satisfies a threshold, such that accessibility to the offending device is reduced. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 104 may poll information from a cloud service to determine where a device is communicatively coupled or connected to a network. In various embodiments, network monitor entity 104 access syslog or SNMP information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for viewing, monitoring, and modifying classification or associated thresholds associated with one or more models. Network monitor entity 104 may further monitor network traffic over time to reclassify entities as new entities join the network, entities rejoin the network, and new models are made available.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 102 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine-based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a NAT device (e.g., firewall, router, etc.) dynamically, periodically, or a combination thereof.

Information from one or more external or third-party systems (e.g., system 110) may further be used for determining one or more tags or characteristics for a device. For example, a vulnerability assessment (VA) system may be queried to verify or check if a device is in compliance and provide that information to network monitor entity 104. External or third-party systems may also be used to perform a scan or a check on a device to determine a software version.

Device 116 can include agent 102. The agent 140 may be a hardware component, software component, or some combination thereof configured to gather information associated with device 116 and send that information to network monitor entity 104. The information can include the operating system, version, patch level, firmware version, serial number, class vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 130 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third-party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud-based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, LongTerm Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Figure 2:
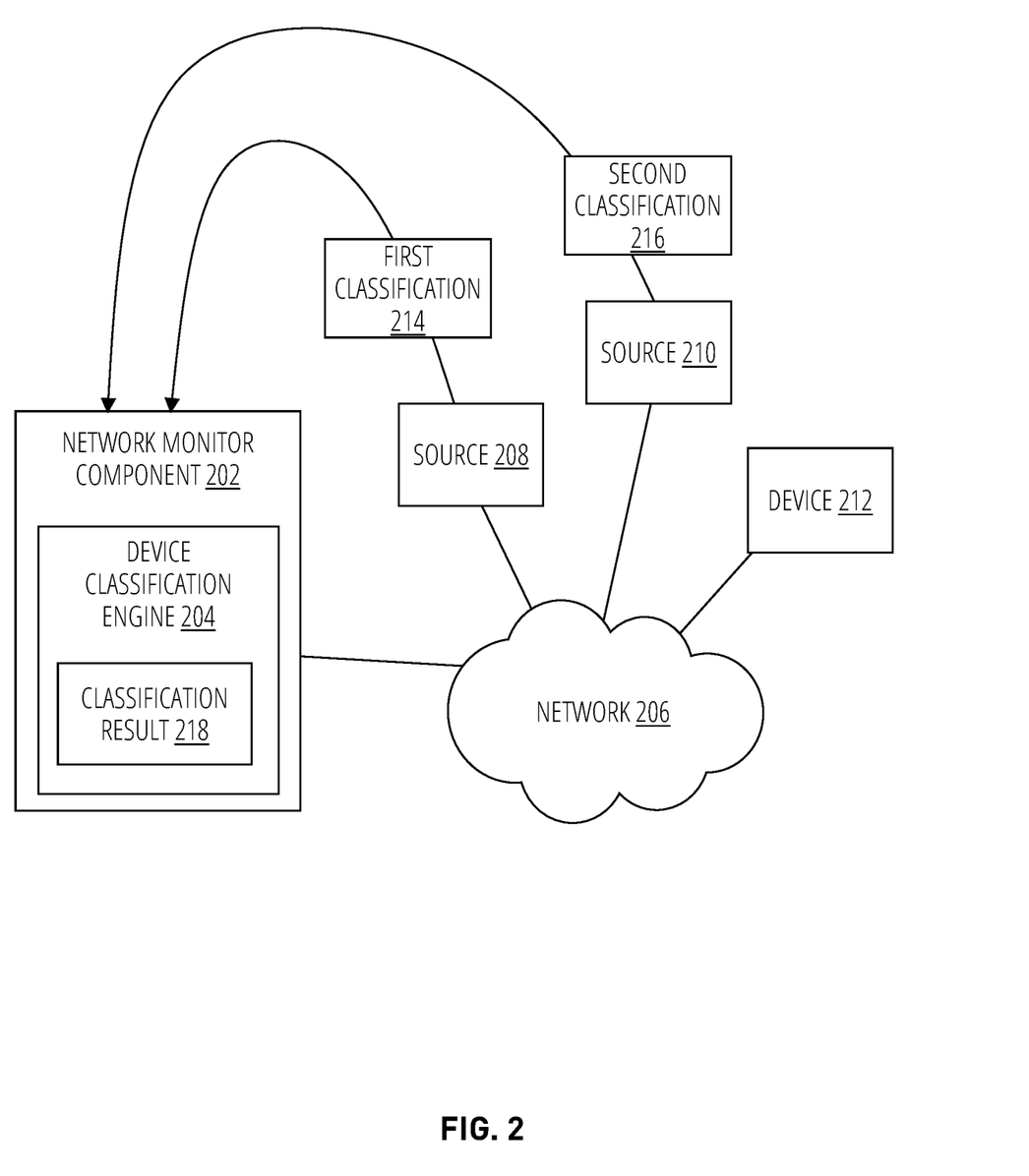
FIG. 2 depicts an illustrative computer network with a network monitor component in accordance with one implementation of the present disclosure.

FIG. 2 depicts an illustrative computer network with a network monitor component 202 in accordance with one implementation of the present disclosure. Network 206 may represent a single computer network, or it may represent numerous computer networks which may be interconnected or isolated from each other.

A device 212 may be communicatively coupled to network 206. In some examples, device 212 may be representative of one or more device, or a plurality of devices. Each device may be referred to as an endpoint in the system. Device 212 may include computer servers, IoT devices (e.g., a television, sensors, appliances, medical equipment, exercise equipment, or other IoT device), personal computers, databases, mobile phones, tablet computers, operational technology (OT), one or more entities, or another computing device. Network 206 may include one or more network devices such as network device 106.

Network monitor component 202 may be integral to one or more devices or one or more entities such as network monitor entity 104. Network monitor component 202 may be communicatively coupled to the network 206. Network monitor entity 202 may include a device classification engine 204. The device classification engine 204 may be operable to perform operations to classify one or more devices such as device 212.

Device classification engine 204 may obtain a first classification 214 of a device on a network from a first source 208 (e.g., an active probing source). Device classification engine 204 may obtain a second classification 216 of the device 212 on the network from a second source 210 (e.g., a machine learning based source). A classification of a device may include a plurality of properties such as function (e.g., printer, camera, mobile phone, game console, healthcare infusion pump, etc.), information technology (IT) or operational technology (OT), or other device. The first classification 214 and the second classification 216 may be different. For example, the first classification may indicate that the device 212 is a 'mobile device' and nothing more, while the second classification may indicate that the device 212 is a 'smart phone' with 'operating system X' and 'model number 111'.

Network monitor component 202 may determine a classification result 218 of the device based on selecting the first classification 214 or the second classification 216. For example, in response to the first classification 214 and the second classification 216 being different, network monitor component 202 may look to one or more source selection algorithms to determine which of the classifications 214 or 216 to use and which source candidate (e.g., source 208 or source 210) is to be selected to classify device 212. The decision may be based on one or more factors such as, for example, string matching, pattern recognition, weight of each source, confident of each source, or other factor or combination thereof. In some examples, the network monitor component 202 may determine a classification result 218 based on selecting at least one of available classifications (e.g., the first classification 214 or the second classification 216). In some examples, the network monitor component may select a given property from a one of a plurality of available sources, and not more than one. For example, the network monitor component may determine a classification result 218 based on selecting a property from the first source 208 or from the second source 210, but not both.

It should be understood that although shown with two sources, aspects of the present disclosure may determine a classification result 218 using more than two sources. Each of the plurality of sources may classify a device 212 on the network 206 in a different manner, using a different technology. In some examples, to classify each source, the device classification engine 204 may determine which source selection algorithm to use by referring to a configurable setting (e.g., a score configuration table or other configuration file). The setting may include a priority of which algorithm to use for a given device property or device class or both.

The device classification engine 204 may select which source selection algorithm (e.g., score-based, text mining-based, or depth-based) to use based on the device 212 and the sources of the classifications 214, 216. The device classification engine 204 may dynamically change which source selection algorithm to use from one device to another device.

In some examples, network monitor component 202 may use a score-based source selection algorithm to resolve which of the first classification 214 or the second classification 216 to select. For example, upon receiving different classifications (e.g., the first classification 214 and second classification 216) from different sources (e.g., source 208 and source 210) for the same device 212, the device classification engine 204 may determine the classification result 218 of the device 212. The device classification engine 204 may reference a score configuration table that includes a first score associated with the first source and a second score associated with the second source. For example, if the first score is greater than the second score or otherwise indicates that the first score is more reliable for a classification, than the first source 208 may be selected.

A score configuration table may include a score for each source, per class vendor, or device function. The score configuration table can be different from one environment to another, for example, from one network to another network, from one customer to another customer, from one data center to another data center, or based on network type. The score configuration table may be tailored to select classification sources based on its environment, thereby providing flexibility in how such a selection is made. Rules for selecting between classification sources can be set by a user to target classification of a specific device based on class vendor, or other property, without influencing the classification of other devices.

A text-mining algorithm may include comparing the classifications provided by each source to identify text or symbols that prioritize one of the sources over another. For example, the text-mining algorithm may prioritize a source if it provides capital letters, or a mix of capital and lower-case letters, or a mix of letters and numbers, or one or more pre-defined strings (e.g., 'ver', 'OS', etc.), or a combination thereof.

A depth-based algorithm may include comparing classifications provided by each source and selecting which of the classifications has a greater depth. The depth may include the taxonomy depth (e.g., number of properties) provided in the classification from a given source. For example, if the first classification 214 from source 208 is 'A/B' and the second classification 216 from source 210 has a greater taxonomy depth of 'A/B/C/D', then device classification engine 204 may select the second classification 216 as the source for the classification result 218. As a result, the classification result 218 for device 212 may be 'A/B/C/D'. The depth-based algorithm may use an anchor to determine the taxonomy base. For example, 'A' or some other anchor may be used as the base, and additional properties (e.g., B, C, etc.) may each contribute to the depth.

In some examples, the score table may indicate which algorithm to use for a given device class vendor. For example, the score table may indicate that for IT devices, the score-based algorithm will be used, and for OT devices, text-mining algorithm is used to select the source provider. In another example, the score table may indicate that devices from 'Vendor A' will selected based on the score-based algorithm, but devices from 'Vendor B' will be selected based on a depth-based algorithm. Further, the score table may indicate which algorithm to use for each property for a given class vendor, as described in other sections.

In some examples, the device classification engine 204 may take properties from different sources to determine the classification result 218 for a given device 212. For example, determining the classification result 218 of the device may include selecting the first classification 214 to provide a first property of the device 212 and selecting the second classification 216 to provide a second property of the device 212. The first classification 214 (e.g., 'computer/operating_system_X') may include a first property (e.g., 'operating_system_X'), and the second classification 216 (e.g., 'camera/os_1') may include a second property (e.g., 'camera'). The device classification engine 204 may determine that the operating system property from the first source 208 is higher than that of second source 210 and, in response, rely on the first source 208 to provide the operating_system property. The device may also determine that the function property from the second source 210 is higher than that of the first source 210. In this example, the classification result 218 may include 'camera/operating_system_X' as obtained from both sources 208 and 210.

In some examples, determining the classification result 218 of the device comprises translating the first classification or the second classification to a standard nomenclature. The one or more sources (e.g., 208, 210) may provide its respective classification 214, 216 to the device classification engine 204. The device classification engine 204 may map the respective classifications 214, 216 to a standard language, which may include one or more standard rules such as those governing taxonomy, symbols (e.g., capital or lowercase letters), ordering, or other rules. For example, device classification engine 204 may parse each of the classifications obtained from each respective source (e.g., 208, 210) and translate each of those to a standardized nomenclature using a dictionary to output each of the properties in the source classification with standard nomenclature (e.g., with a standard symbols and ordering). This may be performed prior to applying one or more algorithms to determine which of the classifications to use to determine the classification result 218.

Device classification engine 204 may publish the classification result 218. For example, device classification engine 204 may store the classification result 218 of a given device in a database, or present it to a display or graphical user interface (GUI) (e.g., with a visual map of the network and its nodes), or both. In some examples, device classification engine 204 may publish the classification result 218 and a source of the classification result 218. For example, if source 208 is used to determine the classification result 218, device classification engine 204 may publish that device 212 has a classification represented by the classification result 218 (e.g., Information Technology/Computer/ICS Supervisory/Engineering Workstation) and that the classification result for device 212 is provided by source 208. In some examples, where multiple sources contribute to the classification result 218, the device classification engine 204 can publish each of the sources that contribute to each of the properties of the classification result 218. For example, network monitor component 202 may display the classification results of each device, or store the classification results of each device, or both.

In some examples, the published classification results may be used by the network monitor component 202 to perform other network management tasks such as perform segmentation, provide an alert to a network administrator, update software, perform a patch, or a combination thereof.

The network monitor component 202 may be an on-premise component, it can be deployed as a cloud service (e.g., off-premise) or a combination thereof. Further, one or more of the sources such as source 208, source 210, or both, may be integral to network monitor component 202. Additionally, or alternatively, either of the sources may reside on a separate device, such as a computer server. In some examples, either of the sources may include a third-party vendor. In some examples, each source may utilize a different technology to classify the devices on the network. Further, the device classification engine 204 may automatically perform the operations described (e.g., performed without human input).

Figure 3:
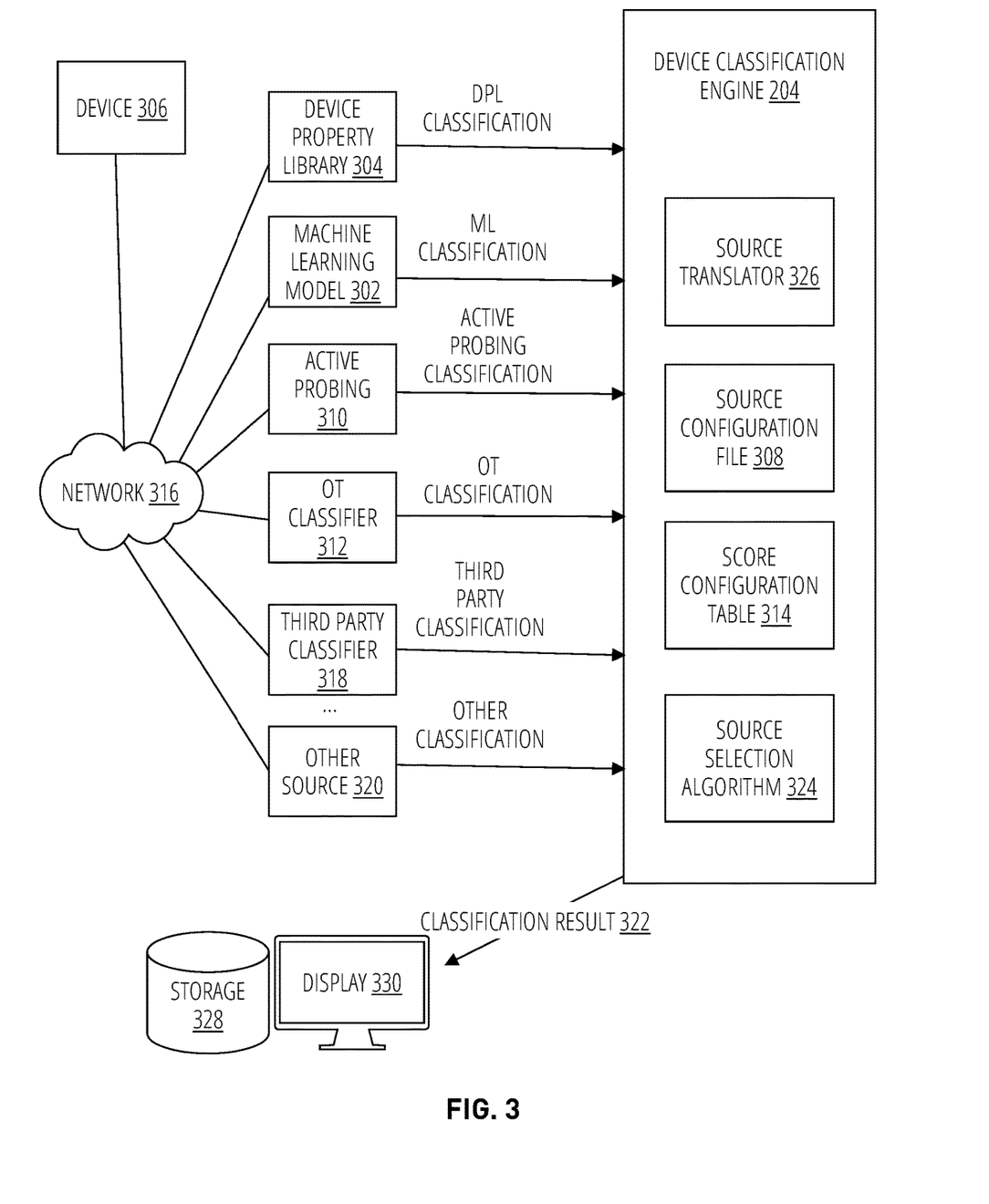
FIG. 3 depicts an example of a computer network with a device classification engine in accordance with one implementation of the present disclosure.

FIG. 3 depicts an example of a computer network with a device classification engine 204, in accordance with one embodiment of the present disclosure. Network 316 may represent a single computer network, or it may represent numerous computer networks which may be interconnected or isolated from each other. Each network 316 may include one or more devices such as device 306 that is coupled to the network 316. A variety of devices may be connected to network 316 such as computer servers, IoT devices (e.g., a television, sensors, appliances, medical equipment, exercise equipment, or other IoT device), personal computers, databases, mobile phones, tablet computers, operational technology (OT), one or more entities, and more. Network 316 may include one or more network devices such as network device 106.

Device classification engine 204 may obtain a classification from each of a plurality of sources. Each source may also be referred to as a classification source. Each of the plurality of sources may utilize a different technology. For example, the plurality of sources may include a device property library 304 that parses network traffic to classify devices based on fingerprints, a machine learning model 302 that parses network traffic to classify devices using a trained machine learning model, an active probing source 310 that may probe devices on the network 316 to classify each device, an operational technology classifier 312 that may utilize OT-specific information or protocols to classify devices (e.g., OT devices), a third party classifier 318, or other source 320 or combination thereof.

The device classification engine 204 may obtain each of the respective classifications from each classification source, and select which source will be used to classify a given device. The device classification engine 204 and one or more of the sources may be integral to a common entity or device. In such a case, the sources may internally pass values to the device classification engine 204 (e.g., using one or more internal API calls). In other examples, one or more sources may be remote with respect to device classification engine 204. The device classification engine 204 may communicate with such devices directly or indirectly over network 316 or a different network to obtain the respective classifications. In some examples, the device classification engine 204 may include one or more plugins that facilitate communication between the device classification engine 204 and one or more external sources. Each of the plugins may serve as a classification source from the perspective of the device classification engine 204. The device classification engine 204 may listen for communications from each of the plugins, for example, through a HostInfo database (DB).

In some examples, device classification engine 204 may select from one or more source selection algorithms 324 to determine which source to use for a given classification of device 306. For example, source selection algorithms 324 may include a score-based algorithm that looks at a score configuration table 314 to determine which classification from each source has the best score.

The score configuration table 314 may include a score, a priority for algorithms, or both, for each property of a given classification. The score configuration table 314 may have a score for each source, per discoverable property by each source. The score per source may vary depending on property, or class vendor, as shown in the table 1 below.

The device classification engine 204 may determine which algorithm to use based on which of the sources are present, or based on a class vendor of a device 306, or both. Other factors or data may be used as well to determine which algorithm to use in selecting the source. An example of score configuration table 314 is shown in the table 1 below.

classification for 'model', and device property library (DPL) has the highest score, the device classification engine 204 may select the model classification from DPL to classify that property (model) for device 306. A score of '−1' may indicate that the source does not provide a score. In such a case, the next algorithm prioritized under 'Source selection algorithm' in the score configuration table may be used.

To determine the operating system of device 306, the device classification engine 204 may refer again to the score configuration table 314 and determine that algorithm 6 (depth-based) is prioritized. Assuming that active probing 310 provided the classification with the longest depth (e.g., the greatest number of properties), then the operating system may be provided by the classification given by active probing 310. If, however, all the sources that provided classifications have the same depth (e.g., the same taxonomy depth), then the device classification engine 204 may fall back on the score-based algorithm and select the source with the highest score (e.g., the ML model).

In some examples, the algorithms or scores may be based on classification type of the device (e.g., IT or OT device). In other examples, the algorithms or scores may be based on

TABLE 1

| Class Vendor | Property | Source Selection Algorithm | Device Property Library (DPL) | ML | Active probing | OT Classifier | ... |
|---|---|---|---|---|---|---|---|
| VendorA | model | 1, 5 | 90 | 80 | 20 | −1 | ... |
| VendorA | op sys | 6, 1 | 40 | 50 | 20 | −1 | ... |
| VendorA | function | 6, 1 | 20 | 75 | 20 | −1 | ... |
| VendorA | os detail | 1 | 30 | 75 | 50 | −1 | ... |
| VendorA | firmware | 1 | 75 | 75 | 50 | −1 | ... |
| VendorB | model | 1, 5 | 20 | 50 | 70 | 95 | ... |
| VendorB | op sys | 6, 1 | 90 | 50 | 70 | 95 | ... |
| VendorB | function | 5, 1 | 90 | 50 | 70 | 95 | ... |
| VendorB | os detail | 1 | 90 | 50 | 99 | 95 | ... |
| VendorB | firmware | 1 | 90 | 50 | 99 | 95 | ... |
| ... | ... | ... | ... | ... | ... | ... | ... |

In the example shown with Table 1, the score configuration table shows that for a device that is identified as class or vendor: 'VendorA', for property of 'model', algorithm 1 will take priority to select which source will selected to provide the classification for the device. Algorithm 5 will be used as back-up in the case that algorithm 1 is not available or to resolve the classification in case there is a tie resulting from algorithm 1. Algorithm 1 may represent a score-based algorithm; algorithm 5 may represent a text-mining algorithm; and algorithm 6 may represent a depth-based algorithm. Under the score-based algorithm, device classification engine 204 may refer to a score configuration table 314 to determine a score that is associated with each source for a given classification (or property of a classification), and select the classification (or property) from the source with the highest score. With the depth-based algorithm, device classification engine 204 may select classifications obtained from the respective sources with the greatest depth of classification (e.g., the greatest taxonomy depth), as described. Under the text-mining algorithm, device classification engine 204 may parse each classification for symbolic traits (e.g., capital letters, lower case letters, numbers, pre-defined strings, etc.) and select the source based on the presence or absence of the traits.

Using the example in table 1, for 'VendorA' and property type 'model', the device classification engine 204 may refer first to the respective scores associated with each source. Assuming that each of the sources provided a respective the class vendor of the device. Additionally, or alternatively, algorithms or scores are specific to each property of a given device.

The device property library 304 may include one or more plugins that parse network traffic for the presence of one or more fingerprints such as, for example, a predefined mac address or Dynamic Host Configuration Protocol (DHCP) identifier, or other fingerprint that may be unique to a given device (e.g., device 306). The device property library (DPL) 304 may reference a library to identify one or more properties (e.g., vendor, model, function, operating system, etc.) of a device based on the one or more fingerprints. For example, DPL may find the presence of a MAC address in network traffic and map this MAC address to a given vendor, model, function, and operating system. DPL 304 may provide this classification to the device classification engine 204. In some examples, DPL 304 may classify the device 306 using passive techniques (e.g., through observing network traffic without sending a request for response on the network 316). Additionally, or alternatively, DPL 304 may use active techniques (e.g., probing, or other techniques), to determine the DPL classification.

The machine learning model 302 may include one or more machine learning models that takes network traffic from network 316 as input. Machine learning model 302 may include a regression model, a decision tree, a random forest, an artificial neural network, a clustering algorithm, or other machine learning model or combination thereof. The machine learning model may be trained (e.g., through supervised or unsupervised training) to determine a classification of a device based on the network traffic. Training the machine learning model may differ depending on the type of machine learning model used. The classification may include one or more properties, such as, for example, 'IT device/Model x/camera/operating system unknown'.

Active probing 310 may include one or more network devices (e.g., network device 106) that can probe the network (e.g., with a broadcast message or unicast message) and receive a response from a device (e.g., device 306). Based on the response from device 306, active probing 310 may determine a classification of device 306. For example, the response may include information that describes the vendor, model number, operating system, firmware, software version, or other metadata of the device 306.

The sources may include an operational technology (OT) classifier 312. An OT classifier may use active probing or passive network analysis to classify device 306. The OT classifier 312 may have access to proprietary communication protocols or other information that it can use to obtain information from an OT device. OT may refer to hardware and software that specializes in changing, monitoring, or controlling a physical device or event. Examples of an OT device include SCADA (Supervisory Control and Data Acquisition) which may be used to monitor or control plant equipment, such as in telecommunications, waste control, water control, or other industries. Other OT devices include medical equipment such as control or monitor for an infusion pump, a ventilator, an electrocardiogram, or other medical equipment. OT devices often communicate with proprietary communication protocols. OT classifier 312 may include one or more OT classifiers that may target different families of OT devices such as from different vendors or serving different functions or both.

In some examples, a third-party classifier 318 may also classify device 306 on network 316. A third-party classifier 318 may utilize passive technology to classify device 306. A third-party classifier 318 may include one or more third party classifiers. The third-party classifier 318 may be dropped into the network 316 such that it is communicatively coupled to the device classification engine 204. Further, any of the other sources described may be a third-party classifier. In some examples, a third-party classifier 318 may be part of the external system 110 of FIG. 1. Further, one or more other sources 320 may also be communicatively coupled to network 316 to classify device 306 and provide such classification to device classification engine 204. Some sources may utilize overlapping technologies.

Device classification engine 204 may apply a source translator 326 to each of the classifications obtained from each of the different sources. The source translator 326 may convert each classification to a common or standard nomenclature. For example, the ML classification may classify device 306 as 'IT/Computer/windows', while the active probing classification may classify device 306 as 'desktop/ windows_OS'. The source translator may convert the ML classification to 'IT/Computer/Windows' and active probing classification to 'IT/Desktop/Windows'. The source translator 326 may have a table (e.g., a dictionary) that it may reference to convert each classification to a standard nomenclature.

The device classification engine 204 may determine the classification result 322 based on using source selection algorithm 324 to select which classification to use from which source. In some examples, determining the classification result 322 may include combining multiple properties from multiple sources. For example, the classification result may use DPL classification to determine the vendor of device 306, the ML classification to determine the operating system of device 306, and so on.

In some embodiments, a new classification is obtainable from a new source in response to the new source being added to a source configuration file 308. The source configuration file 308 may identify a plurality of sources that a respective classification is obtainable from. Additionally, or alternatively, the source configuration file 308 may identify each property name that is associated with each of the plurality of sources. The device classification engine 204 may refer to the source configuration file 308 to determine which sources are available to obtain classifications from. With such a feature, the device classification engine may interact with and obtain classifications from a new source by referring to the source configuration file 308 without rebuilding the device classification engine 204. The overall system is scalable.

The device classification engine 204 may publish or otherwise output the classification result 218, and the one or more sources that provided it. For example, the device classification may publish: Prim_classification Information Technology/Computer Prim_classification source Active Probing. Assuming that source 208 is 'Active Probing' and classification 214 includes 'Information Technology/Computer', the classification result 218 would be: Information Technology/Computer, and the source would be: Active Probing. The classification result 218 may be saved to storage 328 which may comprise a computer-readable storage medium. The classification result 218 may be stored with other information such as a network address of device 306. Further, device classification engine 204 may store a classification for each and every device on network 316, which may include a plurality of devices. The classification result of each device may be presented to a display 330. In some examples, the classification is shown as part of a network map that visually indicates which devices are connected to the network, and network segmentations, if any.

Such a system may determine the classification result in a flexible and scalable manner, without a need for a new DPL rule on a per source candidate basis. This also avoids the need to add one or more DPL rules each time a new source is integrated, thereby reducing the total number of rules which can have a negative impact on performance. Further, the determination of one or more classification results 322 may be tuned and adjusted by adjusting the score configuration table 314 or the priority of source selection algorithms 324 for each property, or both. A user may make such adjustments based on data analysis research to improve accuracy of the classification result, without rebuilding the device classification engine 204.

In such a manner, the device classification engine 204 may determine which source candidate should be utilized for each device or type. The manner in which the source selection algorithm is selected allows for more efficient and granular classification of devices. Using a source configuration file allows for the ability to integrate new classification sources in a scalable manner, without modifying the rule-based DPL, or any other source. Deciding on classification based on device type or vendor allows for increased control over the classification results, by picking the best source candidate for that specific vendor or type.

Figure 4:
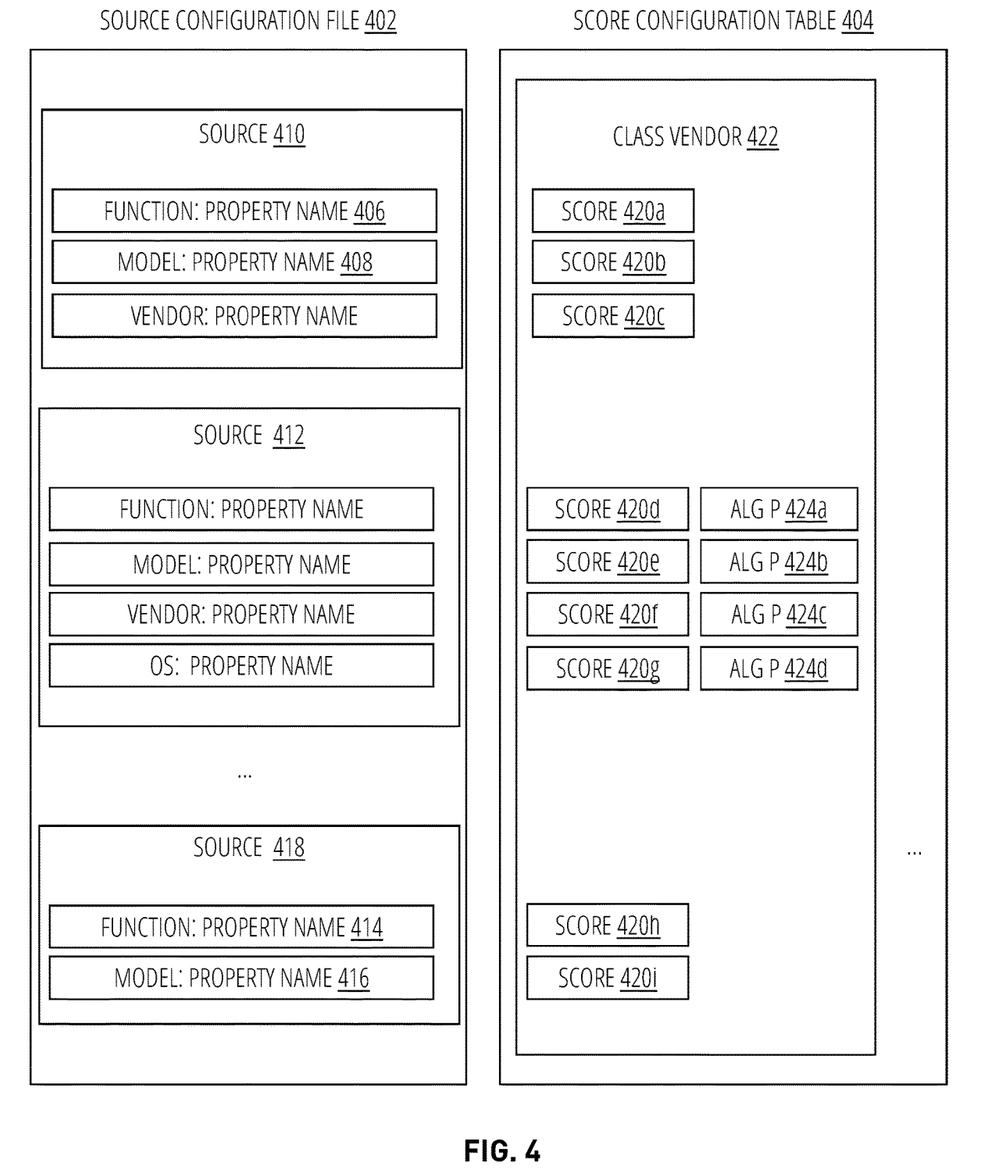
FIG. 4 depicts an example of a source configuration file and score configuration table in accordance with one implementation of the present disclosure.

FIG. 4 depicts an example of a source configuration file 402 and score configuration table 404 in accordance with one embodiment of the present disclosure. Source configuration file 402 may include, for each source, one or more properties that is obtainable from the respective source. For each of these properties, a respective score may be stored in score configuration table 404. The source configuration file 402 may correspond to examples described in other sections. For example, source 410 may correspond to a device property library. Source 412 may correspond to a machine learning model. Source 418 may correspond to an active probing source, and so on.

For each source, the obtainable properties may be indicated by a unique name. For example, the function property name 406 for source 410 may be 'dpl_function'. The model property name 408 for source 410 may be 'dpl_model', and so on. When the device classification engine obtains a classification from a given source, they may tag each property of that classification with the property name as designed in the source configuration file. The device classification engine may track and select from each of the properties provided by each source using the tags.

The score configuration table 404 may include a plurality of class vendor types such as class vendor 422. A class vendor may include a normalized representation of a vendor. For example, different sources may classify a vendor differently, such as 'XYZ Inc' or 'XYZ LTD'. Class vendor 422 may include a normalized vendor name such as 'XYZ that includes both 'XYZ Inc' and 'XYZ LTD', as well as other variations that may be associated with vendor 'XYZ'. Each class vendor may have its own set of scores (e.g., 420a-420i) where each score may be associated with a property that is obtainable from each source. Further, each class vendor may have its own set of algorithm priorities such as 424a-424d. Each algorithm priority 424a, 424b, 424c, and 424d may include an indication or priority for which algorithm to use for a given property type (e.g., function, model, vendor, OS, OS details, etc.). For example, algorithm priority 424a may include an indication that for 'function', the score-based algorithm will be used to select the source provider for 'function' for vendor class 422. In such a case, the device classification engine may compare scores 420a, 420d, and 420h to determine which of source 410, 412, and 418, respectively, will be used to provide the 'function' for discovered devices that are covered under class vendor 422. Similarly, algorithm priority 424b may include an indication to use a depth-based algorithm to select which source is to provide the 'model' property. In such a case, the device classification engine may compare the depth of the model property name from each of source 410, 412, and 418 and select the source that classifies the device with the greatest depth to provide the 'model' property for class vendor 422. Each algorithm priority may include a plurality of algorithms and an order in which they are to be prioritized, as described in other sections.

To determine the classification result, the device classification engine may select the function from source 418 if it has the highest score among the function provided by the other sources for that device class vendor. For example, the classification from source 418 may be obtained as camera/cam_model123. The device classification engine may tag this classification as 'activeprobing_function camera/activeprobing_model cam_model123', using the property names 414 and 416. The device classification engine may obtain a second classification from source 410 as 'ImageCapture/Model123/ManufacturerA' and tag this as 'dpl_function/ImageCapture dpl_model/Model123 dpl_vendor/ManufacturerA'. Using a score-based algorithm, the device classification engine may compare the scores of 420a-420c associated with source 410 to scores 420h-420i associated with source 418 to determine which of the properties will be selected to be part of the classification result.

It should be understood that the sources in source configuration file 402 may include any combination of sources that provide classifications of devices on a network, and are not limited to those that are depicted in the examples shown. Similarly, score configuration table 404 may include a plurality of class vendor types each with respective set of scores. To integrate a new source classifier to the system, a user may update the source configuration file 402 to add the new source and each of its properties, and update the score configuration table 404 with one or more scores that are associated with the new source and its properties.

Figure 5:
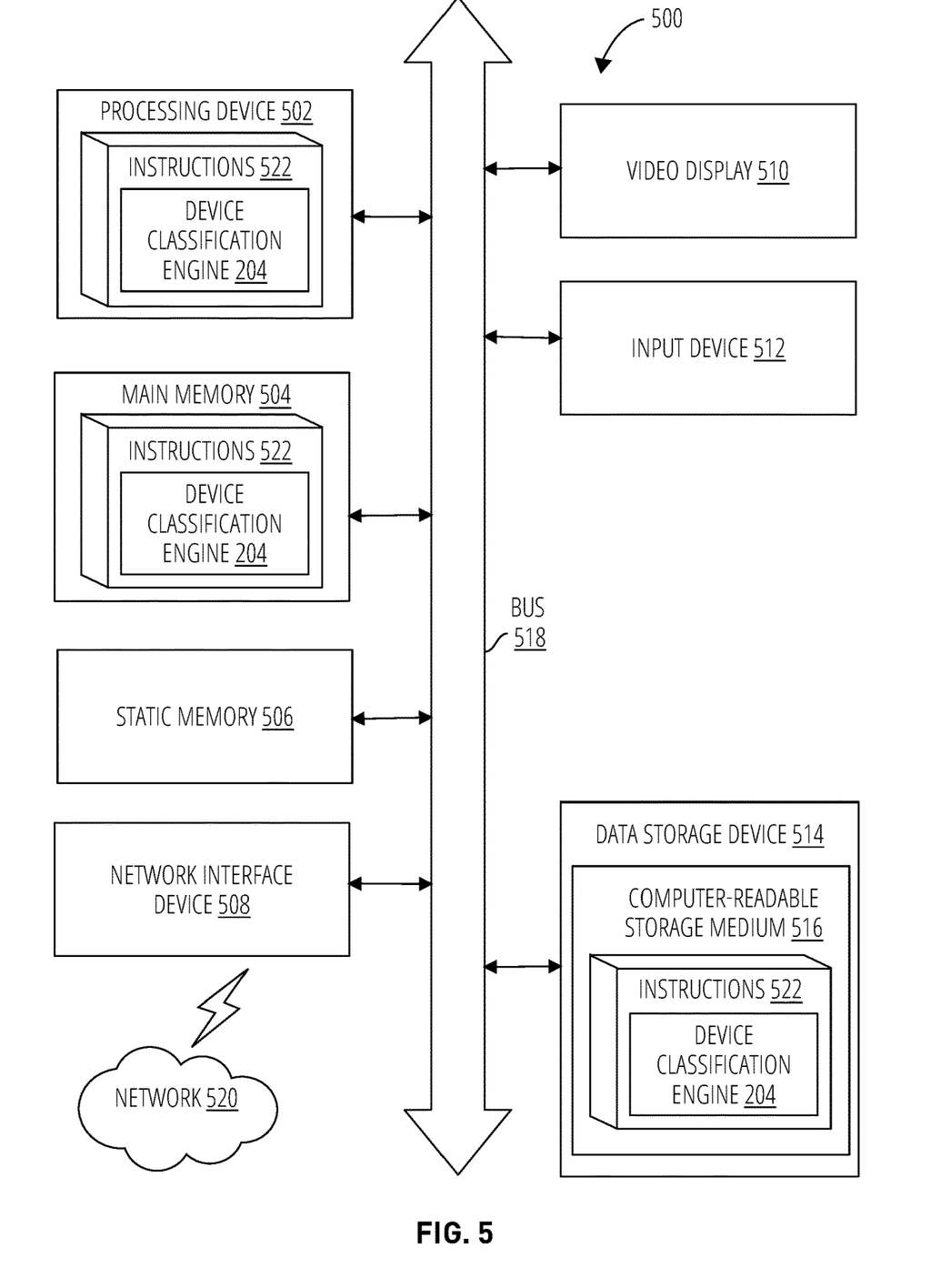
FIG. 5 is a block diagram illustrating an example computer system in accordance with one implementation of the present disclosure.

FIG. 5 is a block diagram illustrating an example computer system 500, in accordance with one implementation of the present disclosure. This can be understood as a diagrammatic representation of a machine in the example form of a computer system within which a set of instructions, for causing the machine to perform any one or more of the methodologies discussed herein, may be executed. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a cloud service, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 500 may be representative of a server, such as network monitor entity 104, 202 running a device classification engine 204 as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 514, which communicate with each other via a bus 518. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to operate as device classification engine 204, as discussed herein.

The data storage device 514 may include a machine-readable computer-readable storage medium 516, on which is stored one or more set of instructions 522 (e.g., software) embodying any one or more of the methodologies of operations described herein, including instructions to cause the processing device 502 to execute device classification engine 204. The instructions 522 may also reside, completely or at least partially, within the main memory 504 or within the processing device 502 during execution thereof by the computer system 500; the main memory 504; and the processing device 502 also constituting machine-readable storage media. The instructions 522 may further be transmitted or received over a network 520 via the network interface device 508.

The computer system 500 also may include a video display unit 510 (e.g., a liquid crystal display (LCD) or a cathode ray tube (CRT)) and an input device 512 (e.g., a keyboard or mouse). In one embodiment, video display unit 510 and input device 512 may be combined into a single component or device (e.g., an LCD touch screen).

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
obtaining a first classification of a device on a network from a first source;
obtaining a second classification of the device on the network from a second source wherein the first classification and the second classification are different, wherein the first source determines the first classification based on a fingerprint in network traffic and the second source determines the second classification based on applying a machine learning algorithm to the network traffic;
selecting a source selection algorithm including selecting a depth based algorithm, based at least on a property of the first classification or the second classification;
determining a classification result of the device based on applying the source selection algorithm to select at least one of the first classification or the second classification, including applying the depth based algorithm to select one of the first classification or the second classification based on a depth of the first classification and a depth of the second classification, wherein the classification result indicates at least a role or a vendor of the device; and storing the classification result to computer-readable memory, wherein a new classification is obtainable from a new source in response to the new source being added to a source configuration file, wherein the source configuration file identifies a plurality of sources that a respective classification is obtainable from, and identifies a respective property name that is associated with each of the plurality of sources.

2. The method of claim 1, wherein selecting the source selection algorithm further comprises selecting a score based algorithm, and wherein determining the classification result of the device further includes referencing a configuration file that includes a first score associated with the first source and a second score associated with the second source.

3. The method of claim 2, wherein the configuration file includes a respective score for each property of a plurality of devices as determined by each of a plurality of sources.

4. The method of claim 1, wherein determining the classification result of the device includes selecting the first classification to provide a first property of the device and selecting the second classification to provide a second property of the device.

5. The method of claim 1, wherein determining the classification result of the device further comprises translating at least one of the first classification or the second classification to a standard nomenclature.

6. The method of claim 1, further comprising publishing the classification result and a source of the classification result.

7. A system, comprising:
a computer-readable memory; and
a processing device, operatively coupled to the computer-readable memory, to:
  obtain a first classification of a device on a network from a first source;
  obtain a second classification of the device on the network from a second source wherein the first classification and the second classification are different, and wherein the first source determines the first classification based on a fingerprint in network traffic and the second source determines the second classification based on applying a machine learning algorithm to the network traffic;
  select a source selection algorithm including to select a depth based algorithm, based at least on a property of the first classification or the second classification;
  determine a classification result of the device based on applying the source selection algorithm to select at least one of the first classification or the second classification, including to apply the depth based algorithm to select one of the first classification or the second classification based on a depth of the first classification and a depth of the second classification, wherein the classification result indicates at least a role or a vendor of the device; and
  store the classification result to the computer-readable memory, wherein a new classification is obtainable from a new source in response to the new source being added to a source configuration file, wherein the source configuration file identifies a plurality of sources that a respective classification is obtainable from, and identifies a respective property name that is associated with each of the plurality of sources.

8. The system of claim 7, wherein to select the source selection algorithm further comprises to select a score based algorithm, and wherein to determine the classification result of the device further includes to reference a configuration file that includes a first score associated with the first source and a second score associated with the second source.

9. The system of claim 8, wherein the configuration file includes a respective score for each property of a plurality of devices as determined by each of a plurality of sources.

10. The system of claim 7, wherein to determine the classification result of the device includes select the first classification to provide a first property of the device and selecting the second classification to provide a second property of the device.

11. The system of claim 7, wherein to determine the classification result of the device comprises to translate at least one of the first classification or the second classification to a standard nomenclature.

12. A non-transitory computer readable medium having instructions encoded thereon that, when executed by a processing device, cause the processing device to:
  obtain a first classification of a device on a network from a first source;
  obtain a second classification of the device on the network from a second source wherein the first classification and the second classification are different, and wherein the first source determines the first classification based on a fingerprint in network traffic and the second source determines the second classification based on applying a machine learning algorithm to the network traffic;
  select a source selection algorithm including to select a depth based algorithm, based at least on a property of the first classification or the second classification;
  determine a classification result of the device based on applying the source selection algorithm to select at least one of the first classification or the second classification, including to apply the depth based algorithm to select one of the first classification or the second classification based on a depth of the first classification and a depth of the second classification, wherein the classification result indicates at least a role or a vendor of the device; and
  storing the classification result to computer-readable memory, wherein a new classification is obtainable from a new source in response to the new source being added to a source configuration file, wherein the source configuration file identifies a plurality of sources that a respective classification is obtainable from, and identifies a respective property name that is associated with each of the plurality of sources.

13. The non-transitory computer readable medium of claim 12, wherein the instructions further configure the processing device to publish the classification result and a source of the classification result.

14. The non-transitory computer readable medium of claim 12, wherein to select the source selection algorithm further comprises to select a score based algorithm, and wherein to determine the classification result of the device further includes to reference a configuration file that includes a first score associated with the first source and a second score associated with the second source.

15. The non-transitory computer readable medium of claim 14, wherein the configuration file includes a respective score for each property of a plurality of devices as determined by each of a plurality of sources.

16. The non-transitory computer readable medium of claim 12, wherein to determine the classification result of the device includes to select the first classification to provide a first property of the device and to select the second classification to provide a second property of the device.

17. The non-transitory computer readable medium of claim 12, wherein to determine the classification result of the device further comprises to translate at least one of the first classification or the second classification to a standard nomenclature.

* * * * *